United States Patent [19]

Mazzocchi

[11] 4,313,198
[45] Jan. 26, 1982

[54] SYNCHRONOUS DEMULTIPLEXER WITH ELASTIC BIT STORE FOR TDM/PCM TELECOMMUNICATION SYSTEM

[75] Inventor: Gabriele Mazzocchi, Piacenza, Italy

[73] Assignee: Societa Italiana Telecomunicazioni Siemens S.p.A., Milan, Italy

[21] Appl. No.: 85,795

[22] Filed: Oct. 17, 1979

[30] Foreign Application Priority Data

Oct. 18, 1978 [IT] Italy ............................. 28848 A/78

[51] Int. Cl.³ ........................... H04J 3/02; H04J 3/06
[52] U.S. Cl. .................................... 370/112; 370/100
[58] Field of Search ................. 370/112, 100; 375/110

[56] References Cited

U.S. PATENT DOCUMENTS

| | | | |
|---|---|---|---|
| 3,804,987 | 4/1974 | Cooper | 370/112 |
| 3,872,257 | 3/1975 | Bleickardt et al. | 370/112 |
| 3,928,727 | 12/1975 | Roche | 370/100 |
| 4,147,895 | 4/1979 | Fenoglio | 370/102 |
| 4,214,128 | 7/1980 | Bovee et al. | 370/112 |

Primary Examiner—Douglas W. Olms
Attorney, Agent, or Firm—Karl F. Ross

[57] ABSTRACT

A synchronous demultiplexer at a receiving station of a TDM/PCM telecommunication system, operating on an incoming bit stream organized in frames of 32 time slots of eight bits each, comprises a random-access memory having 32 cells loaded with consecutive octets in successive time slots under the control of a writing-address generator, stepped by clock pulses extracted from the bit stream, and unloaded at a similar but not exactly identical rate under the control of a reading-address generator, stepped by locally generated clock pulses. Two series of loading pulses a and b, each lasting for a bit period t, are derived from the extracted clock pulses near the beginning and near the end, respectively, of a time slot of duration $T'=8t$ and are fed to a control unit together with a series of unloading pulses c of length 2t occurring once per cycle $T'' \approx T'$ measured by the local clock. The control unit normally selects loading pulses a for timing the transmission of writing addresses to the random-access memory, except when these loading pulses coincide with unloading pulses c which time the transmission of reading addresses to that memory; in the latter instance, loading pulses b are substituted for pulses a.

6 Claims, 7 Drawing Figures

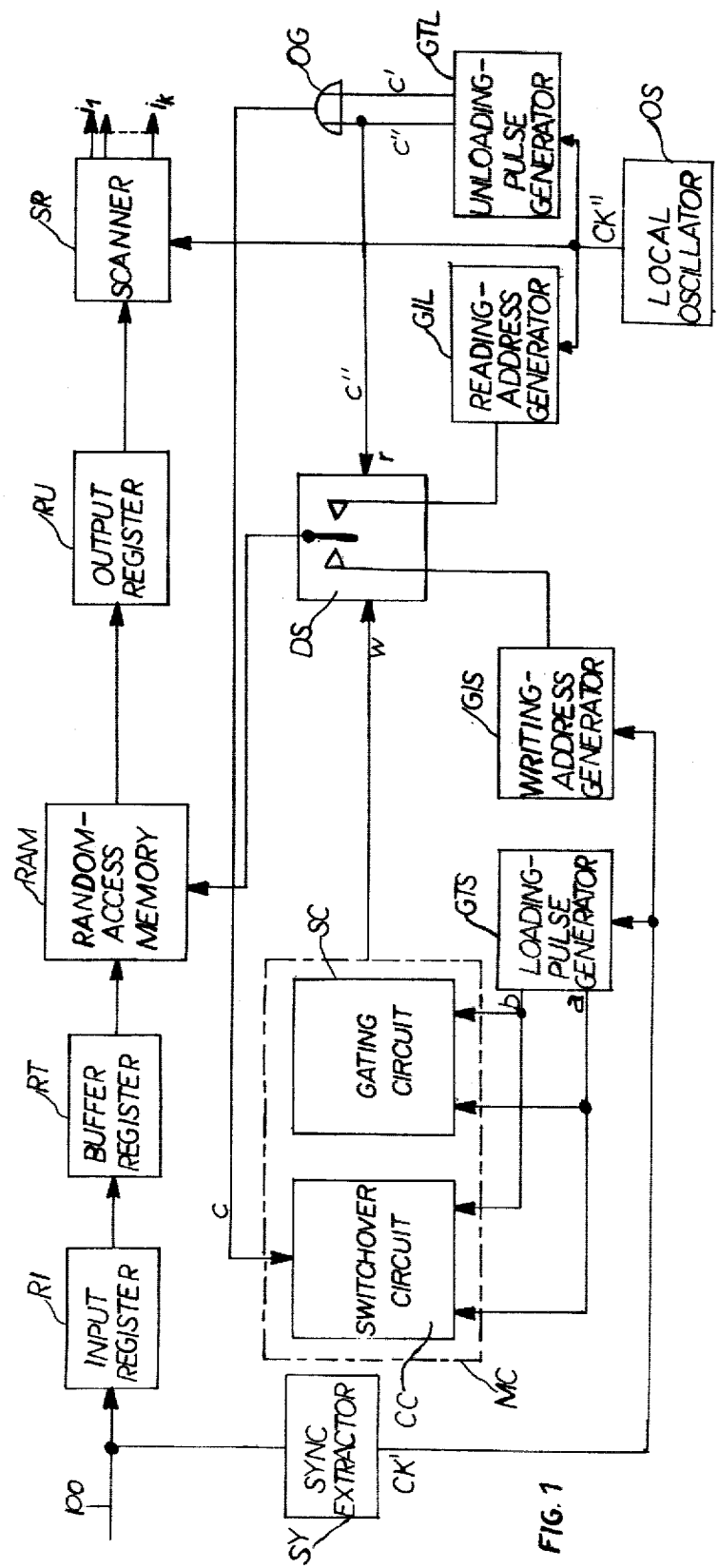
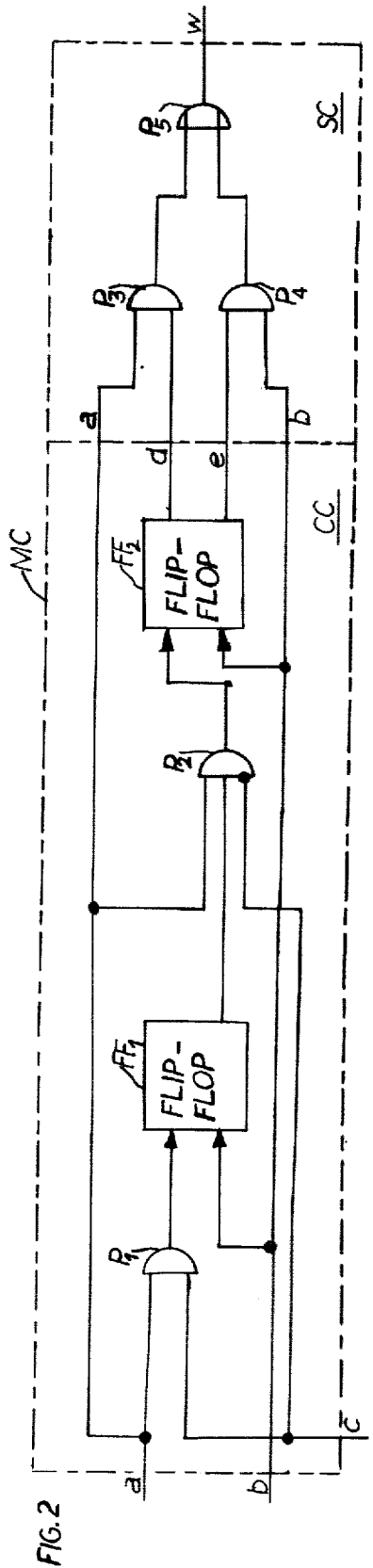
FIG. 1
FIG. 2

SYNCHRONOUS DEMULTIPLEXER WITH ELASTIC BIT STORE FOR TDM/PCM TELECOMMUNICATION SYSTEM

FIELD OF THE INVENTION

My present invention relates to a synchronous demultiplexer for a time-division-multiplex (TDM) communication system of the pulse-code-modulation (PCM) type and, more particularly, to an elastic bit store for such a demultiplexer.

BACKGROUND OF THE INVENTION

In such a telecommunication system, bit groupings such as 8-bit bytes or octets from several lower-order frames are interleaved at a transmitting terminal in higher-order frame for subsequent redistribution to respective channels at a remote receiving terminal. Thus, the bit stream arriving at the latter terminal is organized in a succession of frames of m time slots each encompassing a group of n bits, with m=32 in many instances.

The recurrence rate of these n-bit groups in the arriving bit stream is determined by a clock at the transmitting end whose cadence may be reconstituted at the receiving terminal by a sync extractor operating as a so-called line clock. The rerouting of the interleaved bit groups at the demultiplexer output, however, must be controlled by clock pulses from a local source (also referred to as a "machine clock") whose frequency generally differs, however slightly, from that of the line clock. This is particularly the case with international communications where there is no central clock available for controlling the operations of equipment linked with both terminals. Differences in timing will also arise from the suppression of certain supervisory bits which travel with the message bits over the PCM signal path but which are no longer required on the channels to which the incoming bit groups are distributed, e.g. as described in commonly owned U.S. Pat. No. 4,147,895. That prior patent also discloses an expandable memory, serving as an elastic bit store, which is loaded under the control of clock pulses extracted from the incoming bit stream and is unloaded under the control of locally generated clock pulses of slightly different cadence.

The use of such an elastic bit store is designed to minimize the loss of information due to the disparity of the two clock-pulse cadences. Moreover, the lack of synchronism between the two clocks requires the provision of means for preventing the simultaneous appearance of loading and unloading commands which would impair the operation of the bit store. In the aforementioned prior patent this problem is solved by the use of an adjustable oscillator as the source of local clock pulses, the frequency of that oscillator being continuously adjusted by a phase comparator with inputs connected to a pair of counters respectively controlling the loading and the unloading of an n-stage buffer register. That solution, however, is inapplicable to a demultiplexer whose output side receives clock pulses from a source of fixed frequency, as where that source must also control operations in other parts of the system.

OBJECT OF THE INVENTION

The object of my present invention, therefore, is to provide an improved demultiplexer for a TDM/PCM telecommunication system of the type discussed above in which coincidences between loading and unloading commands are avoided without the need for varying the cadence of locally generated clock pulses.

SUMMARY OF THE INVENTION

A demultiplexer according to my invention comprises an input register connected to the incoming signal path for temporarily receiving successive n-bit groups from the arriving bit stream, synchronization means for extracting a train of first clock pulses CK' with cycles T' from that bit stream (a cycle T' corresponding to one of the m time slots constituting a frame), a local source of second clock pulses (CK" with cycles $T'' \approx T'$, storage means with m cells accommodating respective n-bit groups and with a loading connection to the input register as well as an unloading connection to an output register, and distributing means connected to the latter register for routing successively read-out n-bit groups to different outgoing channels. A first address generator is stepped by clock pulses CK' every cycle T' for identifying a cell of the storage means in which an n-bit group present in the input register is to be written, preferably via an interposed buffer register, by way of the aforementioned loading connection; analogously, a second address generator is stepped by clock pulses CK" every cycle T' for identifying a cell from which an n-bit group is to be read out to the output register by way of the unloading connection. A first timer driven by clock pulses CK' generates two interleaved sets of loading pulses with a recurrence period equal to a cycle T' and of a length corresponding to a minor fraction of that recurrence period, preferably T'/n. A second timer driven by clock pulses CK" generates a set of unloading pulses with a recurrence period equal to a cycle T" and of a length corresponding to a minor fraction of the latter period which, as noted above, is very close to the recurrence period of the loading pulses; advantageously, for reasons that will appear hereinafter, the length of the unloading pulses is substantially double that of the loading pulses, with only one half of each unloading pulse constituting the actual reading command. A gating circuit connected to the first timer passes either of the two interleaved sets of loading pulses under the control of switchover means which may include a coincidence (AND, NAND or NOR) gate connected to the two timers so as to give passage only to loading pulses not coinciding with any unloading pulse. The two address generators also alternately connected to an address input of the storage means with the aid of communicating means, responsive to the loading pulses passed by the gating circuit and to the unloading pulses interleaved therewith, for directing the writing and reading operations. Instead of the loading pulses, however, the unloading pulses could be duplicated for selective suppression to avoid a coincidence.

BRIEF DESCRIPTION OF THE DRAWING

The above and other features of my invention will now be described in detail with reference to the accompanying drawing in which:

FIG. 1 is a block diagram of a demultiplexer including an elastic bit store according to my invention;

FIG. 2 shows details of a pulse selector forming part of the demultiplexer illustrated in FIG. 1.

SPECIFIC DESCRIPTION

Figure 3A:
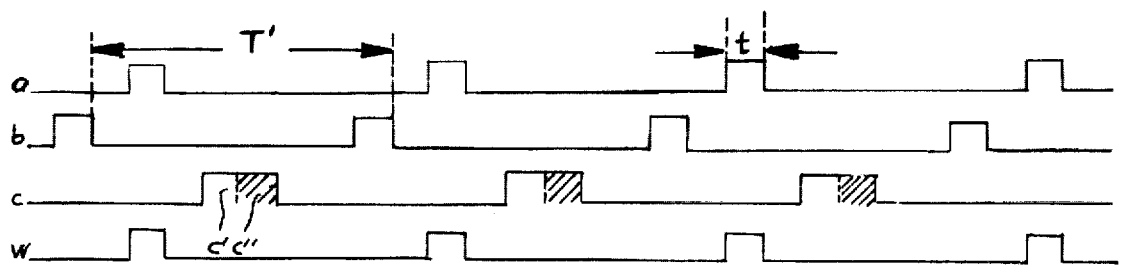
FIGS. 3A–3E are sets of graphs relating to the operation of the demultiplexer.

The demultiplexer illustrated in FIG. 1, connected to an incoming signal path 100, comprises an 8-stage input register RI for the temporary storage of 8-bit bytes forming part of an arriving bit stream. The latter is organized in a succession of frames each subdivided into 32 time slots of duration $T' = 3.9$ μsec, corresponding to a frame length of 125 μsec. Each bit, accordingly, has a length $t = 488$ nsec.

Register RI, serially receiving the incoming bits, discharges them eight at a time in parallel into an 8-stage buffer register RT at the end of each time slot T', under the control of clock pulses CK' derived from the bit stream by a conventional sync extractor SY connected to line 100; for the sake of simplicity, the connections between sync extractor SY and registers RI, RT have not been illustrated.

The bytes stored in buffer register RT are transferred, in consecutive clock cycles T', to respective cells of a 32-cell random-access memory RAM under the control of a writing-address generator GIS stepped by clock pulses CK'. A reading-address generator GIL, stepped by clock pulses CK" from a local oscillator OS, controls the sequential readout of these bytes from designated cells of memory RAM into parallel inputs of an 8-stage output register RU from which their bits are serially transmitted to a scanner SR also stepped by clock pulses CK". The scanner distributes consecutive bytes to a plurality of outgoing channels $i_1$-$i_k$ to re-establish the original lower-order frames, k being generally a number less than m (e.g. 4 as in the prior patent referred to).

The writing and reading addresses respectively issuing from generators GIS and GIL are alternately transmitted to an address input of memory RAM by way of an electronic commutator DS having two switching inputs w and r. Input w, which controls the writing, is energized by one of two trains of loading pulses a and b that are periodically emitted in interleaved relationship from a first timing means in the form of a pulse generator GTS driven by the extracted clock pulses CK'; a pulse a occurs near the beginning and a pulse b occurs near the end of each cycle T'. Input r, which controls the reading, is periodically energized by pulses c" each representing the second half of a longer unloading pulse c emitted by a second timing means in the form of another pulse generator GTL which is driven by the local pulse pulses CK". Pulses c', immediately preceding the pulses c", establish guard intervals coinciding with the first halves of these unloading pulses and are fed jointly with pulses c" to an OR gate OG whose output thus carries the complete unloading pulses c occurring in respective clock cycles T".

The three pulse trains a, b and c, which are all delivered to a pulse selector MC, have been graphically illustrated in FIGS. 3A–3E showing different relative time positions between loading pulses a, b and unloading pulses c. It will be noted that pulses a and b respectively occur in the second and eighth bit positions of each clock cycle T' and have a width t equal to a bit period; each of the two halves c' and c" of unloading pulses c also has approximately the same width t.

Selector MC determines, from the relative time positions of these pulse trains, which of the two loading pulses a and b is to be fed in each clock cycle to the switching input w of commutator DS. For this purpose, unit MC comprises a switchover circuit CC and a gating circuit SC more fully illustrated in FIG. 2. Circuit CC includes an AND gate $P_1$, with inputs receiving pulses a and c, which constitutes the aforementioned coincidence gate and works into a setting input of a flip-flop $FF_1$ whose resetting input receives the pulses b. A second AND gate $P_2$ has a noninverting input receiving the pulses a, another such input tied to the reset output of flip-flop $FF_1$, and an inverting input receiving the pulses c. AND gate $P_2$ works into a setting input of a flip-flop $FF_2$ whose resetting input is connected in parallel with that of flip-flop $FF_1$ for energization by pulses b. Circuit SC comprises two further AND gates $P_3$ and $P_4$, gate $P_3$ receiving the pulses a as well as a signal d from the set output of flip-flop $FF_2$ while gate $P_4$ receives the pulses b together with a signal e from the reset output of that flip-flop. The two AND gates $P_3$, $P_4$ work through a common OR gate $P_5$ into switching input w.

Flip-flops $FF_1$ and $FF_2$ are so designed as to be settable by the leading edges of pulses traversing AND gates $P_1$ and $P_2$, respectively, while being resettable by the trailing edges of loading pulses b. Thus, a pulse b resetting the previously set flip-flop $FF_2$ cannot pass the AND gate $P_4$.

FIGS. 3A–3E represent successive phases in the operation of a demultiplexer in which the cadence of the extracted clock pulses CK' is slightly higher than that of the locally generated clock pulses CK" so that unloading pulses c progressively lag behind loading pulses a and b. In FIG. 3A each pulse c is shown to occur midway of a clock cycle T' so as to be well spaced from the pulses a and b generated near the beginning and near the end of that cycle. With flip-flops $FF_1$ and $FF_2$ (FIG. 2) reset by a previous pulse b, the next loading pulse a passes the AND gate $P_2$ in the absence of an unloading pulse c and sets the flip-flop $FF_2$ whose output signal d makes the AND gate $P_3$ transparent to that same loading pulse. Thus, pulse a traverses the OR gate $P_5$ and reaches the switching input w of commutator DS (FIG. 1) to feed to memory RAM the writing address then present in the output of generator GIS, causing the contents of buffer register RT to be discharged into the cell so designated. Upon the appearance of the corresponding reading address in the output of generator GIL, occurring not more than 32 time slots or 3.9 μsec thereafter, pulse c" acts as a reading command causing the emission of that address to memory RAM whereupon the byte stored in that cell is transferred to output register RU and thence to scanner SR.

Figure 3B:
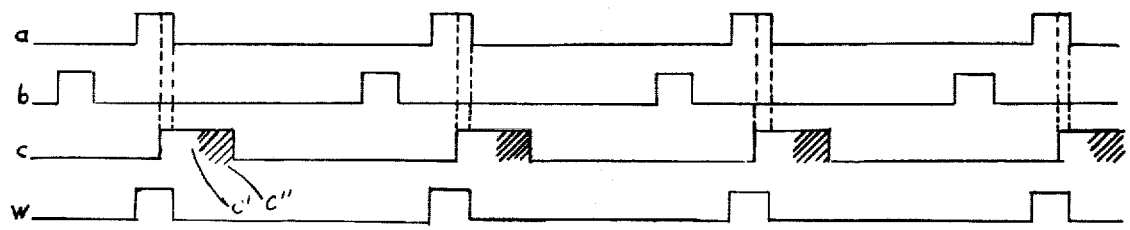

In FIG. 3B the loading pulses have partly overtaken the unloading pulses so that pulses a overlap the guard intervals c'; the extent of this overlap, however, is still insufficient to prevent the transmission of a significant portion of pulse a to the setting input of flip-flop $FF_2$ whereby pulse a controls the writing operation as in the previous instance. The bottom graphs of FIGS. 3A and 3B schematically indicate this situation.

Figure 3C:
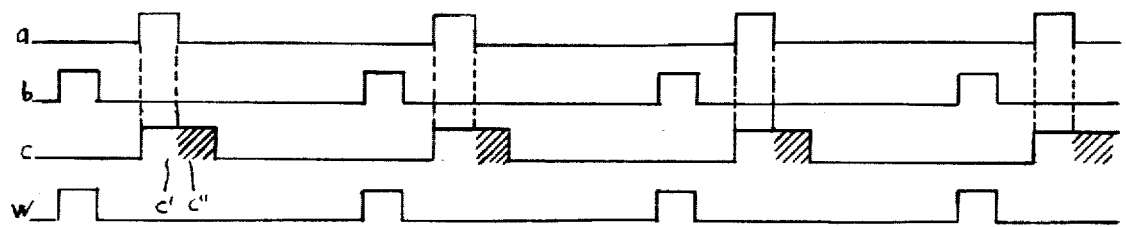

In FIG. 3C the pulses a register more or less completely with the pulse halves c' so that flip-flop $FF_2$ cannot be set. Thus, transmission of pulses a to switching input w is blocked, but pulses b are able to reach that input via AND gate $P_4$ and OR gate $P_5$, as indicated in the bottom graph.

Figure 3D:
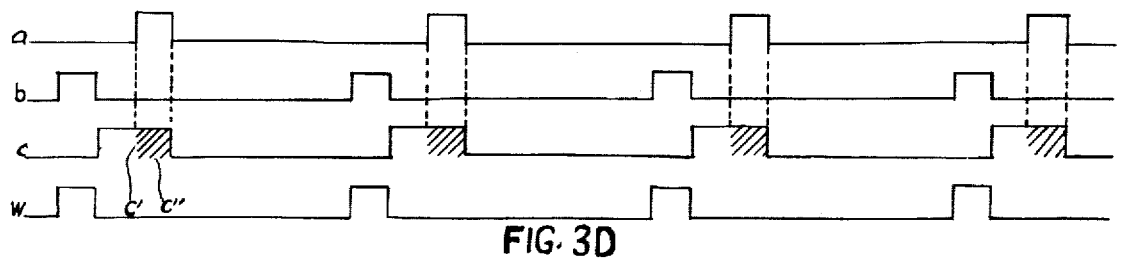

In FIG. 3D the pulses a register with the second halves c" of unloading pulses c, i.e. with the actual read-out commands. Here, again, the setting of flip-flop $FF_2$ is prevented and pulses b are effective to control the writing of bytes in memory RAM.

Figure 3E:
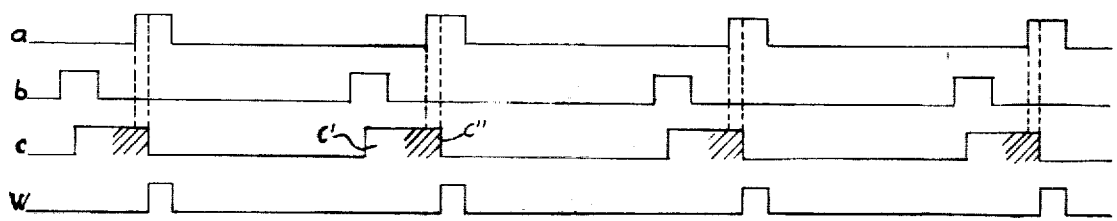

In FIG. 3E, finally, there is only a residual overlap between pulses a and c so that AND gate $P_1$ does not have time to conduct and to set the flip-flop $FF_1$. Thus, upon the termination of pulse c, pulse a again passes the AND gate $P_2$ and sets the flip-flop $FF_2$, with a result similar to that described in connection with FIGS. 3A and 3B except for a certain foreshortening of the time of energization of input w.

In an analogous manner, pulses b would temporarily replace pulses a at switching input w if the cadence of the loading pulses were less than that of the unloading pulses. In either case, the guard interval c' inhibits the simultaneous energization of switching inputs w and r despite the unavoidable delays in the operation of the logical circuitry of selector MC shown in FIG. 2.

It should be noted that the disclosed system could be modified by dividing the reading commands, instead of the writing commands, into two sets of interleaved pulses fed to selector MC, i.e. unloading pulses of duration t occurring at different times in a cycle T". The loading pulses, taking the place of pulses c in FIG. 2, should then be lengthened to establish a guard interval preceding the actual writing command.

I claim:

1. A demultiplexer for an incoming bit stream organized in a succession of frames of m time slots each encompassing a group of n bits arriving over a signal path, comprising:
    input register means connected to said signal path for temporarily receiving successive n-bit groups;
    synchronization means connected to said signal path for extracting a train of first clock pulses with cycles T', corresponding to said time slots, from said incoming bit stream;
    a local source of second clock pulses with cycles $T'' \approx T'$;
    storage means with m cells accommodating respective n-bit groups and with a loading connection to said input register means;
    output register means linked by an unloading connection to said storage means for receiving successive n-bit groups therefrom;
    distributing means connected to said output register means for routing said n-bit groups to different outgoing channels;
    first address-generating means stepped by said first clock pulses every cycle T' for identifying a cell of said storage means in which an n-bit group present in said input register means is to be written via said loading connection;
    second address-generating means stepped by said second clock pulses every cycle T" for identifying a cell of said storage means from which an n-bit group is to be read out to said output register means via said unloading connection;
    first timing means driven by said first clock pulses for generating a series of writing commands with a recurrence period equal to a cycle T' and of a length corresponding to a minor fraction of their recurrence period;
    second timing means driven by said second clock pulses for generating a series of reading commands with a recurrence period equal to a cycle T" and of a length corresponding to a minor fraction of their recurrence period, one of said series of commands consisting of two interleaved sets of pulses;
    gating means connected to said first timing means for selectively passing pulses of either of said interleaved sets;
    switchover means connected to said first and second timing means for controlling said gating means to give passage to writing commands not coinciding with reading commands; and
    commutating means responsive to the pulses passed by said gating means and to the other of said series of commands for alternately connecting said first and second address-generating means to an address input of said storage means.

2. A demultiplexer as defined in claim 1 wherein said interleaved sets are loading pulses generated by said first timing means and said reading commands are portions of unloading pulses generated by said second timing means, said switchover means comprising a coincidence gate with inputs receiving said unloading pulses and one of said sets of loading pulses, said gating means giving passage to said one of said sets in the absence of an output from said coincidence gate indicative of the joint presence of a loading and an unloading pulse.

3. A demultiplexer as defined in claim 2 wherein said switchover means further comprises a first flip-flop settable by said output of said coincidence gate and resettable by said unloading pulses, an AND gate conducting in the presence of a loading pulse of said one of said sets and in the reset state of said first flip-flop when no unloading pulse is present, and a second flip-flop settable by said AND gate and resettable by said unloading pulses.

4. A demultiplexer as defined in claim 2 or 3 wherein said one of said sets of loading pulses occurs in an early part and the other set of loading pulses occurs in a late part of a cycle T'.

5. A demultiplexer as defined in claim 4 wherein said unloading pulses have a length substantially double that of said loading pulses, said unloading pulses having first halves establishing guard intervals and second halves constituting said reading commands.

6. A demultiplexer as defined in claim 1, 2 or 3 wherein said one of said series of commands is a train of pulses having a length of substantially T'/n.

* * * * *